March 30, 1965
M. B. SAMPSON
3,175,725
FLUID MOTOR
Filed July 5, 1962
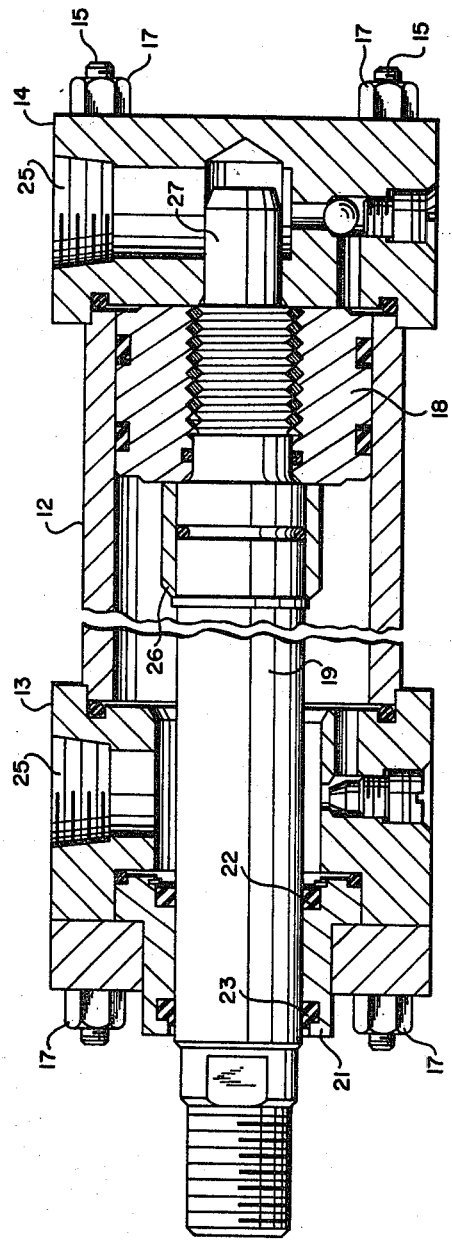
FIG.—1
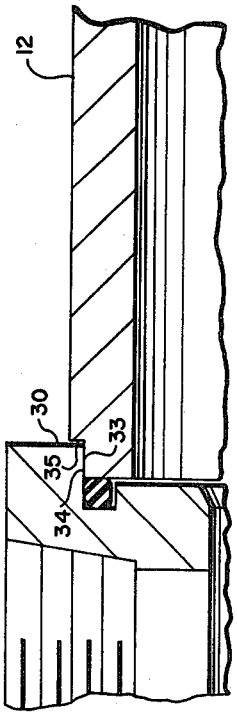
FIG.—3
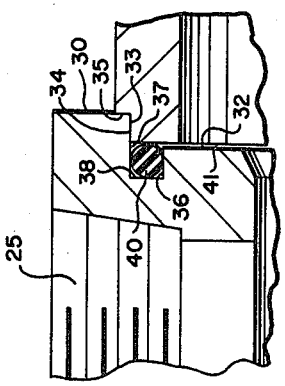
FIG.—2
INVENTOR.
MERRITT B. SAMPSON
BY
*Watts & Fisher*
ATTORNEY United States Patent Office 3,175,725
Patented Mar. 30, 1965

3,175,725
FLUID MOTOR
Merritt B. Sampson, Shaker Heights, Ohio, assignor to
The S-P Manufacturing Corporation, Cleveland, Ohio,
a corporation of Ohio
Filed July 5, 1962, Ser. No. 207,748
5 Claims. (Cl. 220—46)

The present invention relates to the art of sealing against the escape of fluid and more specifically to the end seal construction between a cylinder tube and a mating end cap.

The end seal construction of the invention is particularly applicable to fluid pressure cylinders of the so-called thin wall construction wherein each end cap is affixed to its respective end of the cylinder tube by a plurality of parallel tie rods passing through the end caps generally lengthwise of the tube. Nuts on each end of the tie rods are tightened to press the end caps axially toward one another thereby placing the cylinder tube in compression. In these fluid pressure cylinders there has been a great deal of difficulty in making a fluid tight seal between the ends of the cylinder tube and the mating end caps.

A number of devices have been proposed for preventing the escape of fluids under pressure between the opposed annular metal surfaces making up the end seal. One of these proposed devices provided a sealing ring in a groove formed in the end cap such that the sealing ring bore against the inner surface of the tube. That device was satisfactory for pressures up to about 2,000 pounds per square inch (p.s.i.). However, if subjected to higher pressures the tube expanded and the sealing ring tended to extrude into the space provided by such expansion. The extruded material was cut when the tube returned to its original position with a decrease in the pressure. Such cutting mutilated the sealing ring and permitted the escape of fluid.

Another proposed device provided a conical surface on a tube which seated on a mating conical surface of a groove formed in the end cap. A sealing gasket was positioned between the end of the tube and the bottom of the groove. When the cylinder was placed in service the forces created by extreme pressures and shock loading conditions tended to move the tube and the end cap apart axially in which event the conical surfaces moved apart destroying the seal.

More recently proposals have been made wherein a seal is positioned in a groove in the end cap and the tube projects into the groove. The seal, then, is positioned between the end of the tube and the cap. These proposals have overcome the extrusion problem but at the same time created a new problem. Often the overall length of a cylinder is limited by the space available for mounting it. This more recent proposal requires a thick end cap. This means that where overall length of the cylinder is limited one must either shorten the stroke of the piston or shorten the piston. The first of these alternates obviously limits the ability of the structure to perform work. The second alternative, shortening the piston, reduces the life of the cylinder.

With this invention the cylinder tube telescopes into the end cap and a shoulder on the tube limits the relative inward movement. A circular seal is positioned in an annular groove provided in the end cap. The end of the tube overlies the groove and seal so that the seal is almost completely surrounded by the cap and tube thereby confining the seal to its intended position without danger of extrusion from high pressures. At the same time because the cap does not project into the tube, stroke and piston length are not sacrificed.

Accordingly, an object of the invention is to provide a new and improved end seal construction which at all times maintains the sealing ring in its fluid sealing position while providing a long life full stroke construction.

A further object of the invention is to provide a new and improved end seal construction which does not lose its effectiveness during any relative movement of the annular surfaces making up the end seal.

Still another object of the present invention is to provide a new and improved cylinder end seal construction whereby the sealing ring is maintained in its sealing position at all times and no space or crevice is provided into which the sealing ring can extrude when the head and cylinder move apart under pressure without sacrifice of piston and stroke.

FIGURE 1 is a longitudinal sectional view taken in an axial plane of cross section showing a fluid pressure cylinder utilizing the end seal construction of the present invention.

FIGURE 2 is an enlarged fragmentary, cross-sectional view showing the end seal construction of the invention; and FIGURE 3 is the same view as FIGURE 2, but showing the relative positions of the cylinder tube and the cylinder head under the influence of extremely high pressure conditions.

Referring now to the drawing, a fluid cylinder utilizing the preferred form of the end seal construction of the invention is shown in FIGURE 1. The fluid cylinder includes a cylinder tube 12 and spaced end caps 13, 14 respectively. The end caps take the form of rectangular steel bodies which are positioned to close the cylinder tube ends. They incorporate a new and improved end seal construction which will be described in detail below. The end caps are retained against their respective ends of the cylinder tube by four high tensile steel tie rods 15 and nuts 17, only two of each being shown.

A piston 18 is slidably disposed within the cylinder tube 12 for reciprocating movement between the end caps. A piston rod 19 is secured to the piston 18 and extends through an opening in the end cap 13 to the outside of the cylinder. An annular guide 21 is disposed within the opening in the end cap 13 and surrounds the piston rod with a rod packing seal 22 and a rod wiper seal 23. Ports 25 are provided in each end cap 13, 14 to provide fluid passages into the cylinder tube on each side of the piston. Cushions are provided to slow the piston movement at each end of its stroke. In the fluid cylinder of FIGURE 1, a cushion collar 26 is provided at one end of the piston and a protruding end of the piston rod 27 is formed to provide a cushion 27 at the other.

The invention is particularly concerned with the seal provided between the ends of the cylinder tube and the cylinder end caps. One of these seals is shown on an enlarged scale in FIGURE 2. In that figure, the end cap 13 is shown as having a flat, tube seating surface 30. The end cap 13 is also provided with a recessed or countersunk annular surface 32. The perimeter of the recessed surface 32 is bounded by an axially extending cylinder piloting surface 33. A sealing ring receiving circular groove is formed in the recessed surface 32 at the base of the cylinder piloting surface 33. The circular groove is preferably rectangular in cros-section and in such form includes inner and outer cylindrical wall surfaces 36, 37 respectively, and a bottom 38. The outer cylindrical wall surface 37 of the groove is co-extensive with the cylinder piloting surface 33.

The associated end of the tube or cylinder 12 is provided with a peripheral groove defined by a cylindrical surface 34 and a radial shoulder 35. The cylindrical surface 34 provides a mating surface which pilots on the piloting surface 33. The shoulder 35 abuts the surface 30 of the end cap.

The mating surface 34 and the pilot surface 33 are quite accurately formed to obtain concentricity with the inner cylindrical surface of the cylinder tube 12.

A sealing ring 40 is provided in the ring-receiving groove to prevent the escape of fluid between the mating surfaces of the cylinder and the end cap. The sealing ring is made of a deformable, elastomeric material suitable for use under the particular service conditions of each application.

The assembly of a fluid cylinder utilizing the end seal construction of the invention is very quickly performed without any danger of shearing or damaging the sealing ring. To assemble the cylinder the sealing ring is first placed in the circular groove of the cylinder end cap. The end cap is then telescoped onto the cylinder tube and the tie rods 15 are placed in position and the nuts 17 tightened. As the tie rod nuts 17 are tightened, the cylinder seating surface 30 of each end cap bears against their respective shoulders 35 of the cylinder tube and places the cylinder tube in compression. The shoulders 35 limit the movement of a cylinder tube end surface 41 against the sealing ring such that a gap is provided between the end surface 41 and the recessed surface 32 of the cylinder head.

When placed in operation it has been found that the cylinder tube will expand a few thousandths of an inch in diameter under the influence of extremely high pressures. In FIGURE 3, the full line portion of the cylinder tube indicates in a greatly exaggerated form, the position of the tube when tie rods have been extended by stress.

Severe operation of the cylinder additionally may stress the tie rods on one side sufficiently to allow the shoulder 35 to move away from its abutting position against the cylinder seating surface 30. If this happens however the surfaces 33, 34 remain in tight abutting relationship preventing axial extrusion of the sealing ring into a space between them. In addition the end of the tube and the walls of the groove together substantially completely encase the seal to maintain it in position under all pressure.

As has been described, it is evident that the end seal construction of the invention prevents damage of the sealing ring during assembly, provides increased sealing qualities under extreme pressure conditions and prevents any possible extrusion of the sealing ring through any crevice or space provided during those periods when the cylinder head may move from its abutting position against the end of the cylinder tube. Finally, the large recessed area of the end cap permits critical machining and finishing operations to be facilely performed on the axially extending surface 33. At the same time a long piston for full bearing surface and long life is used and stroke is not sacrified.

Although the specification describes the invention in detail it is believed to comprise essentially the end seal construction between a fluid pressure cylinder tube and a mating end cap mounted on the end of the tube, wherein: The cap is provided with a sealing ring receiving groove in a recessed surface therein and near the base of an axially extending cylinder piloting surface surrounding the recessed surface; the cylinder tube is provided with an axially extending mating surface piloting on the piloting surface of the cap and a radial shoulder bearing against a seating surface on the cap; the groove is sized to snugly receive a sealing ring and thus prevent inward radial movement of the sealing ring, and the end surface of the cylinder tube is disposed across the open side of the groove to prevent extrusion or unseating of the sealing ring.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An end seal for a fluid pressure cylinder comprising in combination:
   (a) an end cap having a seating surface surrounding a recessed surface and an axially extending piloting surface extending from said recessed surface to said seating surface;
   (b) a cylinder tube pressed against said cap and having a radial shoulder and an adjacent axially mating surface, the tube shoulder bearing against the cylinder seating surface and the mating surface mating with the piloting surface;
   (c) the recessed surface of said cap including walls defining a circular sealing ring receiving groove axially in line with a portion of an end surface of said cylinder tube;
   (d) a sealing ring in said groove;
   (e) said groove being sized to snugly receive said sealing ring and to prevent extrusion thereof;
   (f) said portion of the tube end surface being disposed across the open side of said groove and engaging said sealing ring to prevent inward movement thereof; and
   (g) one of said groove walls being an inner wall, said tube having an inner wall spaced radially inwardly from said groove inner wall.

2. The combination of claim 1 wherein said groove is formed in said recessed area at the base of said axially extending surface and the width of said groove is less than the width of the end surface of said tube.

3. A fluid motor comprising:
   (a) an elongated tube having first and second ends, the tube also having walls defining a cylindrical bore therein and first and second concentric cylindrically contoured peripheral surfaces adjacent the ends of the tube;
   (b) said tube also including first and second shoulders spaced respectively from the first and second ends;
   (c) first and second end caps each having a pilot surface telescoped in tight sliding relationship over one of the peripheral surfaces;
   (d) means drawing the caps toward one another into tight clamping relationship with the shoulders;
   (e) said first end cap having a first groove formed therein;
   (f) said second end cap having a second groove formed therein;
   (g) first and second seal rings in the first and second grooves respectively;
   (h) the first end of the tube overlying the first groove and the second end of the tube overlying the second groove;
   (i) each groove having an inner cylindrical wall axially spaced from the tube and spaced radially outwardly from said tube walls; and
   (j) each groove having a cylindrical outer wall forming an extension of one of the pilot surfaces.

4. In a fluid motor having a tube with inner walls defining a piston chamber and a piston reciprocally disposed in the chamber, the improvement comprising:
   (a) an end cap closing one end of the tube and having a face communicating with the chamber;
   (b) said end cap having an endless groove formed around the periphery of said face concentrically of the axis of the chamber;
   (c) said groove being defined by a base wall and inner and outer, longitudinally extending, side walls disposed concentrically about the axis of the chamber;
   (d) an annular seal in the groove and having a thickness measured axially of the chamber greater than the longitudinal dimension of said inner side wall;
   (e) said outer side wall having a longitudinal dimension greater than said thickness and extending past said seal, said outer side wall being longer than said inner side wall by a given dimension and with the portion extending past said inner side wall being a pilot surface;

(f) said tube having a shoulder formed on the periphery thereof and spaced from said one end of the tube a distance less than said given dimension;

(g) said tube having a mating surface extending from said shoulder to said one end and telescoped tightly into said pilot surface;

(h) said one end of the tube abutting said seal and being spaced from said face and said inner side wall, said tube inner walls being spaced radially inwardly from said groove inner side wall; and, (i) means connected to the cap and maintaining the cap in abutment with the shoulder at least when the device is not in use.

5. The device of claim 4 wherein said side walls are cylindrical and said seal is an O-ring.

References Cited in the file of this patent

UNITED STATES PATENTS

| | | |
|---|---|---|
| 2,638,243 | Davies | May 12, 1953 |
| 2,743,034 | Wheatly | Apr. 24, 1956 |
| 2,842,284 | Flick | July 8, 1958 |

UNITED STATES PATENT OFFICE
CERTIFICATE OF CORRECTION

Patent No. 3,175,725            March 30, 1965

Merritt B. Sampson

It is hereby certified that error appears in the above numbered patent requiring correction and that the said Letters Patent should read as corrected below.

Column 2, line 61, for "cros-section" read -- cross-section --; column 4, line 12, after "axially" insert -- extending --.

Signed and sealed this 21st day of September 1965.

(SEAL)
Attest:

ERNEST W. SWIDER
Attesting Officer

EDWARD J. BRENNER
Commissioner of Patents